May 15, 1951     E. L. BARRETT     2,553,292
DYNAMOELECTRIC MACHINE

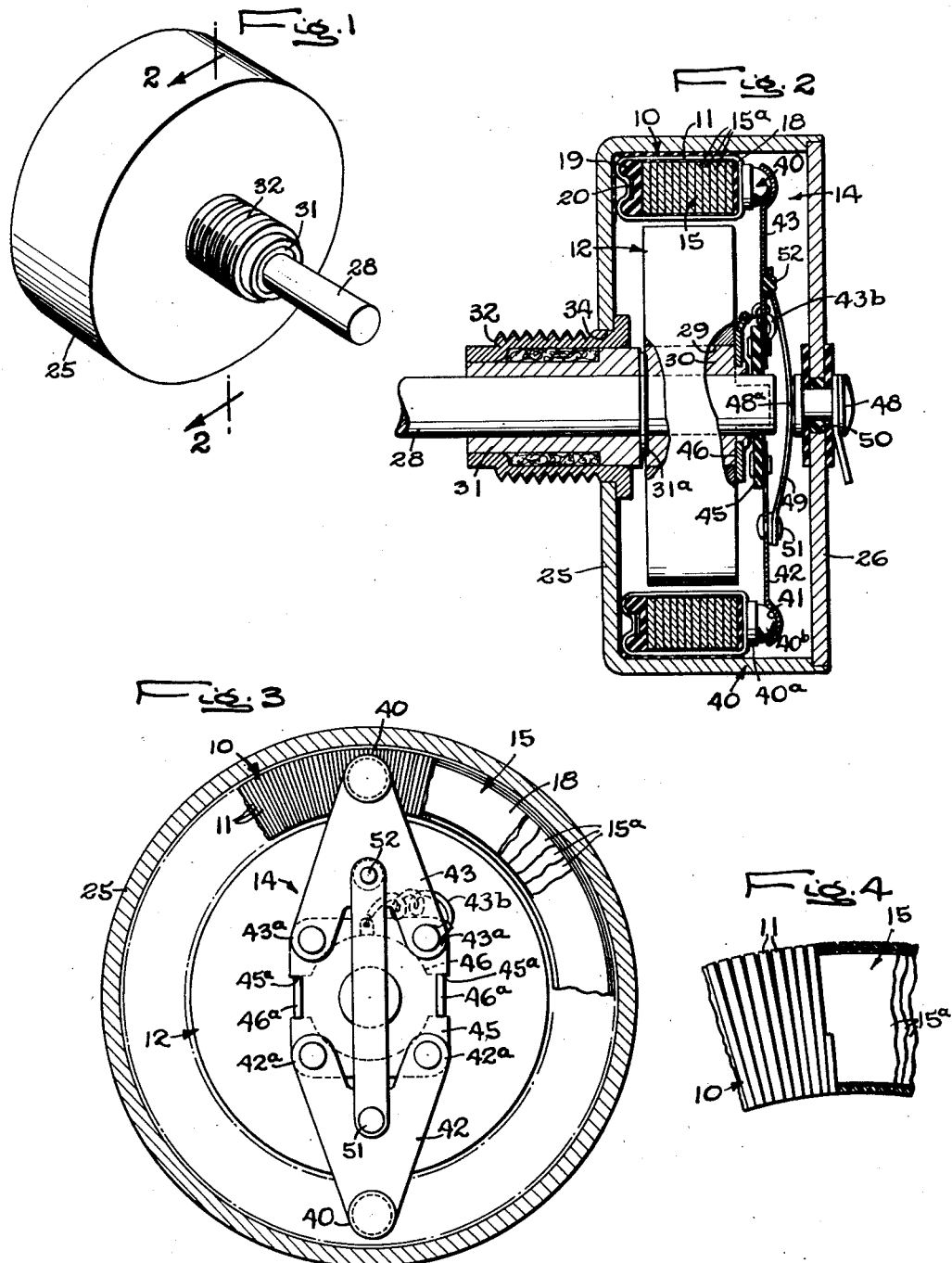

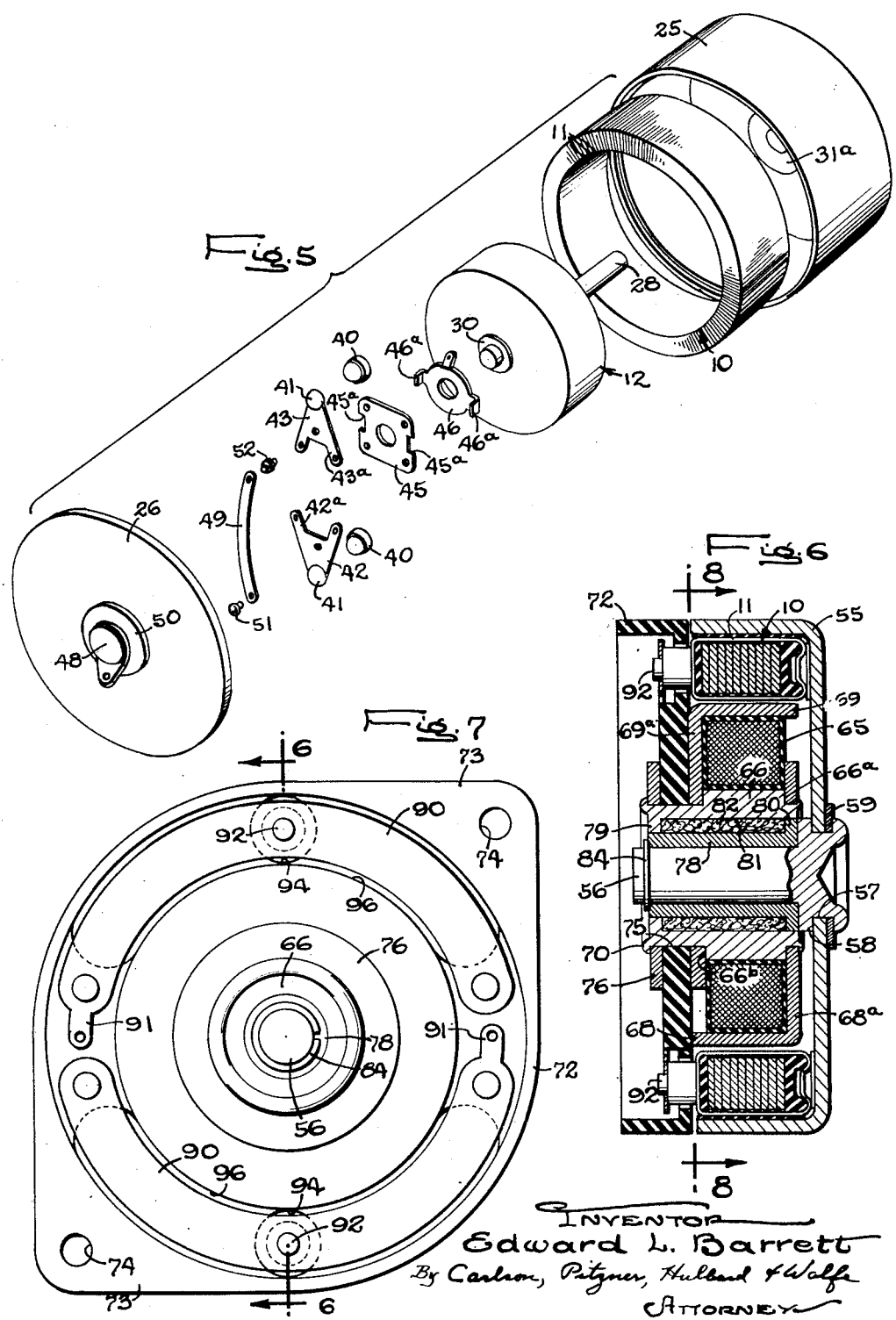

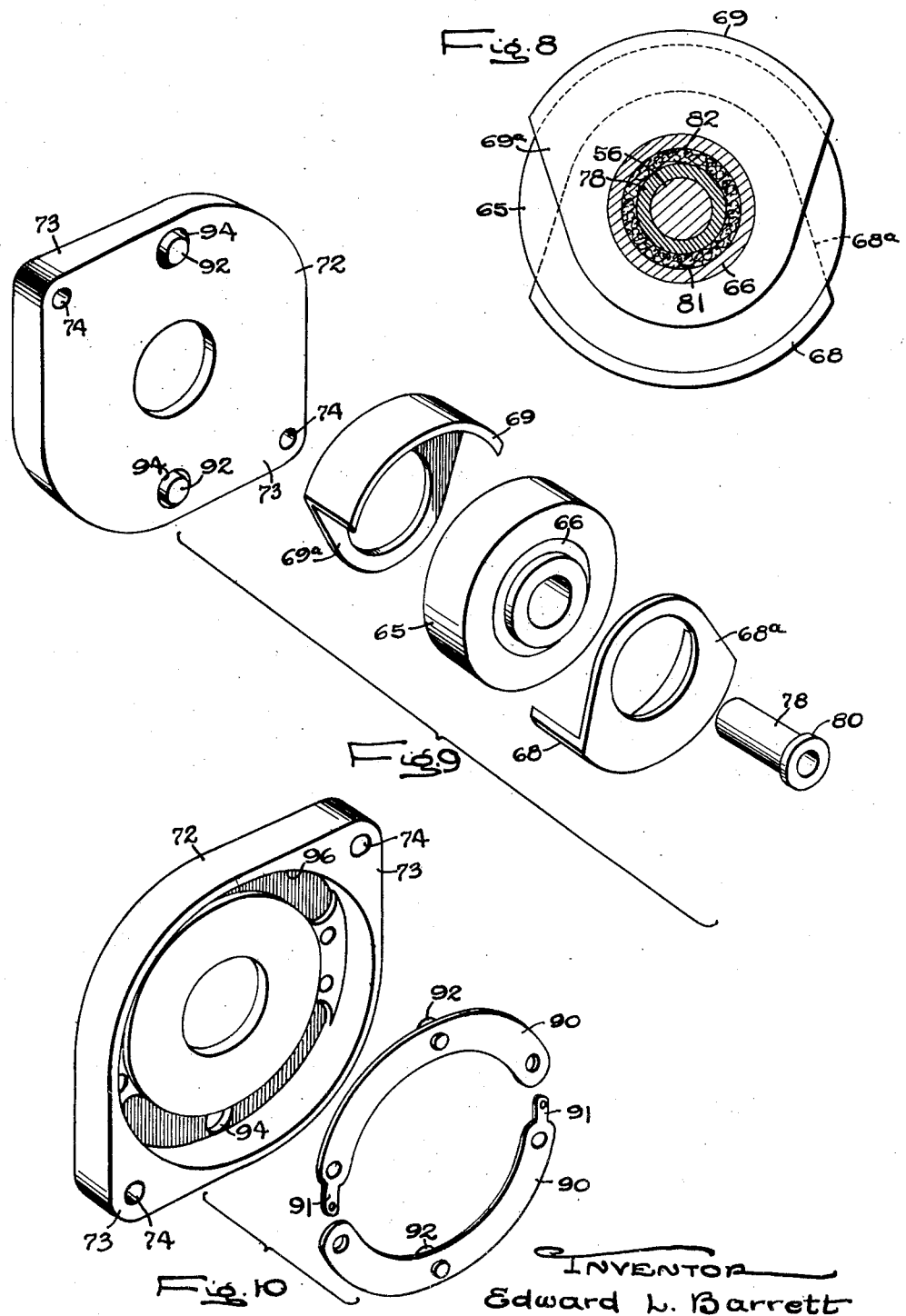

Filed Nov. 20, 1948     4 Sheets-Sheet 4

INVENTOR
Edward L. Barrett
By Carlson, Pitzner, Hubbard & Wolfe
ATTORNEY

Patented May 15, 1951

2,553,292

UNITED STATES PATENT OFFICE 2,553,292

DYNAMOELECTRIC MACHINE

Edward L. Barrett, La Grange, Ill., assignor to Edward L. Barrett and Ann K. Barrett, copartners, doing business as Barrett-Keenan Company, Chicago, Ill.

Application November 20, 1948, Serial No. 61,173

23 Claims. (Cl. 171—252)

The present invention relates to dynamo electric machines, and more particularly to improvements in commutator type dynamo electric machines.

One general object of the invention is to provide a dynamo electric machine intended primarily for use as a motor which is of exceedingly simple construction and which permits of economical manufacture but is nevertheless efficient, having a strong torque in relation to its size.

A more specific object of the invention is to provide a novel electric motor embodying an armature of torodial form enclosing a field member and in intimate heat conducting relation to a cylindrical case for efficient cooling even under conditions of heavy overloading.

A still further object lies in the provision of an electric motor of the above character which has its brushes directly engaging the elements of the armature winding, doing away entirely with the usual commutator which not only enhances compactness but substantially eliminates commutation difficulties and insures constant torque for all rotor positions. It is a related object to provide a brush type motor having a minimum axial extent and in which the parts are snugly telescoped together to produce maximum utilization of space.

It is another object of the invention to provide an electric motor particularly well suited for use in automobiles or the like which is durable both electrically and mechanically, requiring substantially no maintenance and well adapted for single hole mounting in the manner of a simple rheostat.

The objects of the invention thus generally set forth, together with other objects and ancillary advantages are attained by the construction and arrangement shown by way of illustration in the accompanying drawings, in which:

Figure 1 is a perspective view of an assembled motor constructed in accordance with the present invention.

Fig. 2 is a central longitudinal section taken substantially in the plane of line 2—2 in Fig. 1.

Fig. 3 is a plan view of the motor shown in the preceding figures with the case cover removed.

Fig. 4 shows a fragment of the motor armature in partial section.

Fig. 5 is an exploded perspective view of the motor shown in the preceding figures.

Fig. 6 is a central longitudinal section through a modified form of the invention and taken substantially in the plane of line 6—6 in Fig. 7.

Fig. 7 is an end view of the modified form of motor illustrated in Fig. 6.

Fig. 8 is a transverse section taken substantially in the plane of line 8—8 in Fig. 6.

Fig. 9 is a fragmentary exploded perspective view of the field elements and base portions of the modified form of the invention.

Fig. 10 is a rear exploded perspective view of the modified motor base and brush structure.

Figure 11:
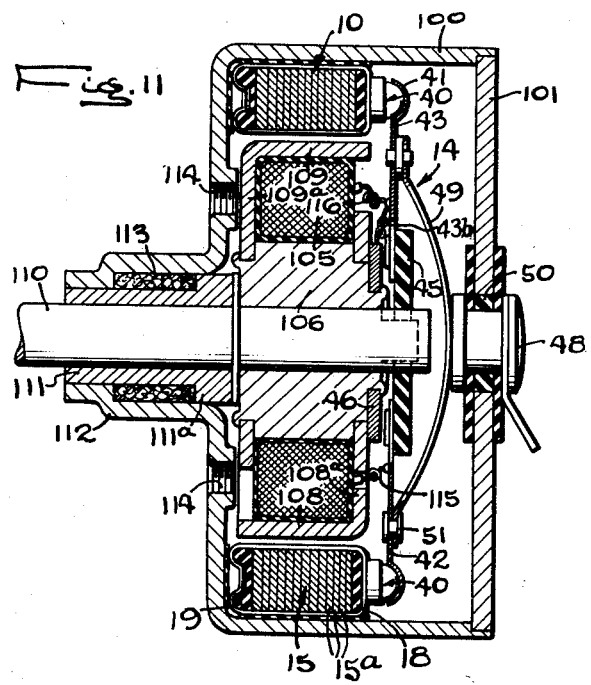
Fig. 11 is a central longitudinal section through still another modified form of motor constructed in accordance with the invention.

While the invention is susceptible of various modifications and alternative constructions, there are shown in the drawings and will herein be described in detail several preferred embodiments, but it is to be understood, however, that there is no intention to limit the invention to the forms disclosed, but it is intended to cover all modifications and alternative constructions falling within the spirit and scope of the invention as expressed in the appended claims.

For purposes of exemplification and explanation of its various novel features, the invention has been shown as embodied in several forms of commutator type motors, the field being either a permanent magnet or an electromagnet and the armature in each case being of toroidal form. It will be appreciated that the basic components, viz. an armature and a field member together with a brush assembly, permit of incorporation in an almost infinite number of forms and can thus be readily adapted to the requirements of the particular use desired. This motor is especially suited for operation from a low voltage, direct current source of power such as the conventional storage battery in an automobile. The driving of small control and indicator devices in aircraft, windshield wipers and radio antenna raising and lowering mechanisms in automobiles are but a few examples of the fields in which the exemplary forms of motor find utility. Its comparatively light weight and especially its extreme compactness in proportion to its developed torque, render it especially suited for use where space and weight are at a premium. Its high efficiency is obviously desirable especially when it is to be supplied from some limited power source such as an automobile storage battery.

In carrying out the invention (Figs. 1-5), an armature 10 of annular form having an endless toroidal winding 11 thereon is employed, together with a field member 12 which is preferably of generally cylindrical form and disposed within the armature 10 and a brush assembly 14 for supplying current to the armature. The brushes of the assembly 14 are in direct engagement with elements of the winding 11 at diametrically spaced points thereon and are rotatable relative to the armature and fixed or stationary with respect to the field member.

A particularly important feature of the invention is the construction of the armature 10. In each of the embodiments shown it includes a core 15 made up of a series of flat ring laminations 15a disposed in stacked relation and which are of ferromagnetic material of low retentivity such, for example, as silicon steel. On the ends of the core 15 are disposed insulating rings 18 and 19, the outer surface of the ring 18 being flat and the outer surface of the insulating ring 19 being provided with a channel 20. The winding 11, which is of toroidal form is preferably formed of enameled wire of square cross-section and is disposed about the core, being electrically insulated therefrom, with its free ends spliced together to make the winding endless. Such construction of the core permits comparatively loose wrapping of the winding 11 about the core, preferably with the adjacent elements or turns thereof lying against each other on the inside of the toroid, upon initial fabrication of the armature and thereafter the winding is tightened by staking or crimping it into the channel 20. The elements of the winding are thus drawn flat across the outer surface of the ring 18. If desired the rings 15a comprising the laminations of the core may be initially deformed or warped so that upon staking of the winding 11 into the channel 20 and thereby flattening out the rings a slight tension will be maintained on the winding when the armature is in finally assembled form.

After completion of the assembly of the armature the enamel insulation on the outer surface of the flat portions of the winding elements adjacent the end ring 18 is removed thus baring the successive convolutions to provide a plane flat annular commutating surface disposed in a plane substantially perpendicular to the axis of the machine for direct engagement by the brushes of the brush assembly 14. It can be seen, therefore, that this results in several advantages: first, no additional commutator structure is required; second, commutation is substantially perfect since the turn to turn voltage is low and since, as one winding element is engaged by a brush, a complementarily disposed winding element on the opposite side of the toroid passes out of engagement with the other brush; third, there is a considerable space and weight saving; and fourth, the material and operations required in the manufacture of the device are minimized.

The exemplary motor illustrated in Figs. 1 through 5 inclusive, embodies a generally cylindrical cup-shaped casing 25 having its open end closed by an end cap 26. The casing 25 forms a protective enclosure, and is preferably made of non-magnetic material having good heat conducting properties such as brass. This casing is snugly telescoped over the armature winding, the latter being stationary in this instance. With the armature pressed into the housing 25 the outer surfaces of the winding elements are in intimate thermal contact with the inner wall of the housing but electrically insulated therefrom. This contact between the winding and the casing provides adequate cooling of the armature without necessity for circulating air within the casing, thus making it possible not only to totally enclose the motor but to reduce the included free space within the housing.

In the embodiment of Figs. 1-5 the field member 12 comprises a solid cylindrical disk or slug of magnetizable material having high magnetic retentivity, alnico being a material suitable for the purpose. This cylindrical disk can be economically formed by simply sintering a blank of the proper size, which may be ground a small amount for finishing, and then magnetizing it to manifest magnetic poles at diametrically disposed points on its periphery. Thereafter it is supported on the motor shaft 28. For this purpose the slug has an axially disposed opening 29 therethrough within which is received an annular bushing 30. The bushing 30 is force fitted on the end of the motor shaft 28.

It is to be noted particularly that since the rotor 12 is of such limited thickness, the shaft 28 can be supported in a single sleeve bearing 31, thereby further enhancing the compactness and economy of manufacture of the motor. The sleeve bearing 31 is, in turn, received in a housing 32. The latter extends through a centrally disposed opening 34 (Fig. 2) in the motor case 25, and is fixed therein by expanding its inner end into tightly fitting engagement with wall of the opening 29 or by brazing. A steel bearing washer 31a is preferably provided at the inner end of the sleeve bearing 31.

The bearing housing 32 also provides a convenient means for mounting the motor, and for this purpose it is externally threaded for engagement of a nut, permitting single hole mounting in the manner of a radio volume control.

Turning now to the brush structure 14 it will be noted that it includes brushes 40 having cylindrical portions 40a with flat bottom surfaces in engagement with the flat top surface of the armature winding 11, and hemispherical portions 40b received in correspondingly formed sockets 41 fashioned adjacent the ends of diametrically disposed arms 42 and 43. The arms 42 and 43 are formed of resilient, electrically conducting material and are of generally triangular shape having lugs 42a and 43a, respectively, at their inner ends by means of which they are riveted or otherwise rigidly secured to a central supporting plate 45 of insulating material.

To obtain relative rotation between the brush structure 14 and the armature 10, the former is drivingly coupled to the shaft 28. To this end there is provided a driving yoke 46 (Fig. 5) having oppositely disposed, axially extending ears 46a thereon, which is force fitted on the end of the shaft 28. The ears 46a are received in notches 45a provided therefor in the insulating plate 45 to which the brush arms 42 and 43 are secured. The driving yoke is so oriented that an angle $\phi$ is maintained between the brush axis and the axis of the magnetic poles of the field member 12. This angle will be subsequently referred to.

The connection between the yoke 46 and the insulating plate 45 is such as to permit free axial movement of the plate, and thus of the whole brush structure, relative to the shaft and rotor to the end that some end play of the shaft and the rotor is permitted without altering the contact pressure between the brushes and the armature.

Current is supplied to the brush arm 42 by way of a contact stud 48 and a contact spring 49. The stud 48 is supported centrally of the case cover 26 in an insulator 50. As shown, the stud is of rivet-like form presenting a flat face 48a for engagement with the spring 49. The latter comprises a strip of flat, resilient, electrically conducting material, arching bridge-like between the brush arms 42 and 43 across the end of the shaft 29, and having one end secured to the arm 42 and electrically connected thereto as by a rivet 51. The other end of the spring 49 is secured to the brush arm 43 but is insulated therefrom by the insulator 52.

Since it is common in electrical circuits to have one side thereof grounded, in the instant motor the brush arm 43 is connected to the case 25, and thus to ground, by way of a pigtail connection 43b, the yoke 46, the shaft 29, bearing 31 and the bearing housing 32. Since the brush structure is reversible by 180° on the yoke 46, a reversal of the direction of rotation can be obtained by simply reversing the positions of the brush arms 42 and 43. This is done simply by removing the motor case cover 26 and lifting the brush assembly 14 so as to disengage the notches 45a and driving yoke ears 46a, and then rotating the assembly through 180°. Thus, this form of the invention is adaptable for use with electrical systems, such for example, as those in automobiles where either the negative side or the positive side may be grounded but in which a certain direction of rotation is required. This novel mounting also permits ready replacement of the brushes without disturbing any of the other elements of the brush structure.

Other advantages also result from the construction of the brush assembly 14 as set forth above. The engagement of the flat central portion of the contactor 49 with the flat face 48a of the stud 48 prevents any tendency for the assembly 14 to "roll" about an axis extending longitudinally of the assembly. Further, the ball-and-socket joints between the brush arms 42 and 43 and the brushes 40 permit "floating," or free rocking movement, of the brushes so that their entire flat surfaces are maintained in engagement with the armature winding 11, several adjacent turns of the winding being simultaneously engaged by each brush. At the same time low resistance connections between the upper hemispherical brush portions 40b and the brush arm sockets 41 are maintained. An even contact pressure obtains on both brushes through the teeter-totter action of the assembly and the fact that an equal force is exerted at each end of the spring 49.

In Figs. 6 through 10 inclusive, a modified form of motor embodying the present invention is illustrated having certain novel features of construction not possessed by that already described. In this form, the armature 10, which is in all respects the same as that hereinbefore set forth, comprises the rotor for the motor, and the field member comprises its stator. Thus, the armature 10 is received in a generally cup-shaped housing 55 which is fixed to a rotatably journaled shaft 56. To fix the housing 55 on the shaft 56, as shown, the housing is provided with a central opening 57 in its outer wall for the reception of the end of the shaft 56. Adjacent its end the shaft 56 is provided with a peripheral flange 58 for engagement with the inner side of the housing wall. After the housing has been so disposed on the end of the shaft, a washer 59 is then slipped over the shaft and thereafter the end of the shaft is upset so that the wall of the housing is clamped between the washer and the peripheral flange 58.

In this embodiment it would be possible to use a slug of permanently magnetized alnico for the field member but I prefer to use an electromagnet having a coil 65 wound on an annular soft iron core 66. This has the additional advantage, if desired, of providing means for dropping the applied voltage. Diametrically disposed with respect to the coil 65 and the core 66 are arcuate pole pieces 68 and 69 also of magnetic material, being supported in such position by integrally formed arms 68a and 69a, respectively, which are rigidly secured to the opposite ends of the core 66. In the present instance, the central portion of the core is of larger diameter than its end portions thus providing shoulders 66a and 66b against which the pole piece arms are abuttingly received.

To mount the instant motor a mounting plate or base 72, which is preferably of insulating material, is provided. As shown, the base has oppositely disposed lugs 73 integrally formed therewith which, in turn, are provided with holes 74 for the reception of mounting bolts, or the like.

As previously set forth, in this embodiment the field member comprises the stator, and thus it is fixed to the mounting base 72. For this purpose the annular core 66 is extended so as to pass through an aperture 75 located centrally of the base 72. Since the material of the base is preferably of insulating material and thus may be either comparatively soft or brittle, a washer 76 is placed over the projecting core end and the latter is upset as at 70 so as to grip the washer, base and pole piece arm 69a in sandwiched relation against the core shoulder 66b.

The annular core 66 serves additionally as a housing and support for a sleeve bearing 78, in which the motor shaft 56 is journaled. To this end, the core is provided with an inwardly extending flange 79 at its inner end, and the bearing is provided with an outwardly extending shoulder 80 at its outer end, the flange and shoulder being of such diameter as to snugly engage the bearing and core, respectively, and thereby support the bearing. It will be noted that the flange 79, the shoulder 80, the inner surface of the core 66, and the outer surface of the bearing 78 define an enclosed, annular space 81 completely surrounding the bearing which may be utilized to contain oil soaked packing 82, from which the bearing 78, preferably of porous metal such as sintered bronze, is adequately lubricated.

The shaft 56 is retained in position in the bearing 78 by engagement of the shaft shoulder 58 with the outer bearing shoulder 80 and by means of a snap ring 84 received in a peripheral groove provided on the projecting end of the shaft.

Since the field member in the instant embodiment comprises the stator for the motor, the brush assembly as well as the field member, is conveniently mounted on the base 72. As illustrated in Figs. 6 and 7 and to enable limited rocking of the brushes to maintain all over brush contact, the brush assembly includes a pair of arcuate arms 90 of resilient, electrically conducting material fixed at their outer ends to the underside of the base and in juxtaposition with the armature 10, and having lugs 91 thereon to permit connection with a source of power. Centrally thereof, the arms 90 are apertured to receive the outer ends of the brushes 92 which, are of generally cylindrical form. The brushes extend through diametrically disposed openings 94 provided therefor in the base 72 so that their flat inner faces engage the flat end of the toroidal winding 11 of the armature. To permit free flexing of the brush arms 90, the underside of the base 72 has arcuate channels 96 provided therein which are located beneath the arms and are of a width enabling adequate clearance.

It will be apparent that this form of the invention readily permits of incorporation in fans or blowers simply through the provision of generally radially extending blades on the case 55. Such blades, would additionally facilitate cooling of the motor itself. Further, the case can be fashioned to serve as the driving element of a gear train, as it can be provided with a ring or disk of soft material such as rubber to permit its use in friction type drive mechanisms.

While the foregoing discussion of this form of the instant invention has been directed primarily to its operation from a direct current source of supply it will be readily apparent to one skilled in the art that this form can be readily operated from an alternating current source of supply. Thus this form may be considered "universal."

In Fig. 11 there is shown still another modified form of motor embodying the instant invention. In this embodiment the armature 10 is stationary and a rotating electromagnet used as a rotor. The armature 10 is here received in a generally cup-shaped case 100 having its open end closed by an end cap 101. As was the case for the other form of motor illustrated in Figs. 1 through 5, inclusive, the case 100 forms a protective enclosure for the motor and is preferably made of non-magnetic material such as brass. In this instance, the field member comprises an electromagnet similar to that described for the form of motor illustrated in Figs. 6 through 10, inclusive, and thus it includes a coil 105 wound on an annular core 106 together with diametrically disposed arcuate pole pieces 108 and 109 which are also of magnetic material and which are supported in diametrically disposed relation with respect to the coil and core by integrally formed arms 108a and 109a. The latter are rigidly secured to the opposite ends of the core 106 in the same manner as described for the illustrative motor of Figs. 6 through 10. Received in the annular core is the shaft 110 for the motor. The shaft 110 extends outwardly from the core 106 where it is supported in a sleeve bearing 111. The latter, in turn, is supported in a hollow housing 112 which, as shown, is integrally formed with the motor case 100. The outer end of the bearing housing 112 is of reduced diameter and the bearing 111 has an outwardly extending shoulder 111a adjacent its inner end so that the bearing is tightly fitted in the housing. Between the bearing housing and the bearing there is an enclosed annular chamber 113 within which may be disposed lubricant soaked packing.

Adjacent the housing extension the case 100 is provided with a pair of screw threaded mounting holes 114 for the reception of bolts or similar mounting elements (not shown) for purposes of support.

As illustrated in this embodiment, the brush assembly is identical with that shown for the illustrative embodiment of Figs. 1-5 inclusive and thus a detailed description thereof is unnecessary, the elements of the assembly being denoted by the same reference numerals.

To supply current to the coil 105 of the field member pigtail connections 115 and 116 are made between the brush arms 42 and 43, respectively, and the coil. These enable the brush assembly to be free floating.

Figure 13:
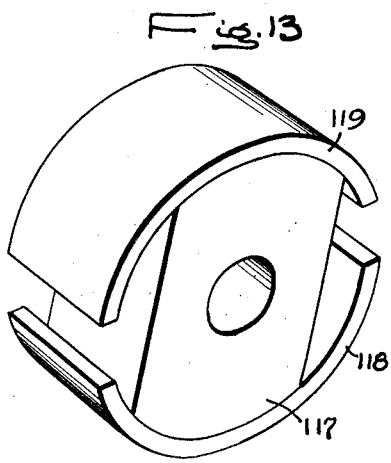
Fig. 13 is a perspective view of a modified form of permanent magnet field member.
Figure 14:
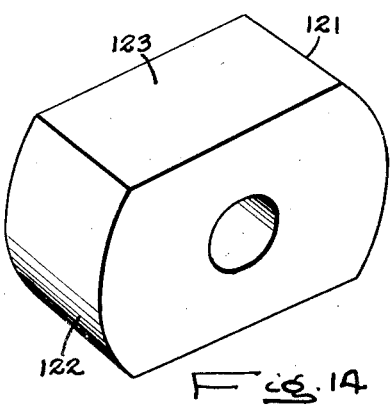
Fig. 14 is a perspective view of another modified form of permanent magnet field member.

In Figs. 13 and 14 there are illustrated two additional forms of field members which may be used either as rotors or as stators. The form illustrated in Fig. 13 comprises a central, permanently magnetized, solid slug 117 of material of high magnetic retentivity having arcuate outer faces to which are rigidly secured pole pieces 118 and 119 of generally semi-cylindrical form, their adjacent ends being spaced apart. In the form illustrated in Fig. 14 the field member comprises simply a slug 120 of magnetic material of high retentivity, such for example as alnico, having arcuate pole faces 121 and 122 and flatened sides 123. Both of these forms are somewhat more simple than the field member shown in the illustrative embodiment of Figs. 1-5 inclusive, primarily because it has been found somewhat easier to magnetize them so as to present properly disposed magnetic poles. In the form illustrated in Fig. 13 the arcuate pole pieces may be of ordinary mild steel.

Figure 12:
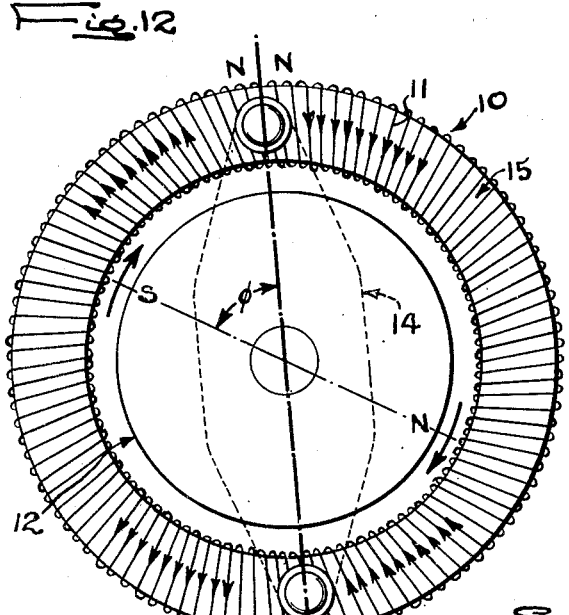
Fig. 12 is a diagrammatic view showing the basic elements of the invention as applied to a motor, indicating their relative positions and those of their magnetic poles so that by magnetic attraction rotation is produced.

The operation of the illustrative embodiments of the instant invention will be apparent from the foregoing. However, by way of summary, it may be described briefly as follows. Considering first the armature 10, and referring particularly to Fig. 12 of the drawings, current supplied thereto from one brush flows in the winding 11 in two paths around the toroid, as is indicated by the arrows, and leaves by way of the other brush. This current flow produces a magnetization of the core such that the core can be considered to be two arcuate bar magnets with like poles together, these poles being manifested beneath the brushes as denoted N—N and S—S. Thus, as the brushes are moved relative to the armature the positions of these poles are correspondingly shifted. The field member on the other hand, whether it be of permanent magnet or electromagnet form manifests magnetic poles in fixed position. In the drawing these poles are indicated by S and N. By fixing the positions of the brushes with respect to the field member so that an off-set angle $\phi$ is maintained between the polar axes of the field member and of the armature 10, magnetic attraction between unlike magnetic poles produces movement of that member which is mounted for rotation. Such movement shifts the brush positions relative to the armature and thus continuous rotation is produced.

While the foregoing sets forth the preferred forms of the invention it will be readily apparent to one skilled in the art that many other specific embodiments enhancing the instant invention can be produced including the use of a field member of generally annular form disposed about the toroidal armature, field members manifesting more than a single pair of magnetic poles in the surface thereof adjacent the armature and brush structures utilizing more than one pair of brushes. Further, if desired, the armature winding may be bared of insulation for engagement by brushes on surfaces other than its end surface.

I claim as my invention:

1. In a dynamo electric machine having a field member and a brush assembly, an armature comprising a core embodying a series of flat ring laminations of ferromagnetic material of low magnetic retentivity and a pair of end rings of insulating material, one of said end rings presenting a smooth outer surface and the other having a channel in its outer surface, an endless winding disposed about said core and deformed into said channel thereby tightening the same about the core with the portions thereof for presentation to the brushes of said assembly drawn snugly across said smooth ring surface, said portions being bared for direct engagement by said brushes.

2. In a dynamo electric machine having a field member and a brush assembly, an armature comprising a core embodying a series of flat ring laminations of low magnetic retentivity each of said laminations having portions deformed out of the normal plane of the lamination, one end of said core presenting a smooth outer surface and the other end having a channel therein, an endless winding disposed about said core and crimped into said channel to tighten the same about the core and draw said laminations closely together whereby a slight tension is maintained on said winding.

3. In a dynamo electric machine having a case, a shaft, a toroidal armature and a field member, a brush structure comprising, in combination, a supporting plate, a pair of brush arms of electrically conducting material diametrically disposed with respect to said armature with their outer ends overlying the same and fixed at their inner ends to said plate, brushes interposed between the outer ends of said arms and said armature and in direct engagement therewith, a conducting stud projecting through said case but electrically insulated therefrom, a contact spring having one of its ends secured to one of said arms being electrically connected thereto and being in engagement with said stud, and a driving yoke rigid with said shaft and engaging said plate to rotate the brush structure with respect to said armature.

4. In a dynamo electric machine having a case, a toroidal armature and a field member, a brush structure comprising, in combination, a supporting plate of insulating material, a pair of brush arms of electrically conducting material diametrically disposed with respect to said armature with their outer ends overlying the same and fixed at their inner ends to said plate, brushes interposed between the outer ends of said arms and said armature and in direct engagement therewith, a stud of electrically conducting material for connection with a source of current being fixed in said case but insulated therefrom, a contact member having one of its ends secured to one of said arms and being electrically connected thereto and being in engagement with said stud, a driving yoke fixed with respect to said field member and engaging said plate to rotate the brush structure with respect to said armature, said yoke being oriented to maintain a fixed offset angle between the axes of the brushes and of the magnetic poles of the field member.

5. In a dynamo electric machine having a case, a shaft, a toroidal armature and a field member disposed within the armature, a brush structure comprising, in combination, a supporting plate of insulating material, a pair of brush arms of resilient, electrically conducting material diametrically disposed with respect to said armature with their outer ends overlying the same and fixed at their inner ends to said plate, brushes interposed between the outer ends of said arms and said armature and direct engagement therewith, a stud of electrically conducting material for connection with a source of current being fixed in said case and having a flat portion disposed in opposed relation to one end of said shaft, a contact spring of flat resilient material bridging said plate and shaft end and having its ends secured to said arms being electrically connected to one of them and insulated from the other and centrally thereof being in engagement with said flat stud portion, and means operative to maintain said brush structure in fixed relation to said shaft and to rotate the brush structure with respect to said armature, the engagement of said flat contact spring with said flat stud portion being operative to prevent any tendency for the brush structure to roll about the axis perpendicular to the rotational axis of said structure and to produce an even contact pressure on said brushes.

6. In a dynamo electric machine having a field member and a toroidal armature one of which is shaft mounted for rotation, a brush structure comprising, in combination, a pair of brushes each having a portion for direct engagement with the winding of said armature, a supporting plate of insulating material disposed centrally of the brush structure and coaxially of the motor shaft, a pair of brush arms secured to said supporting plate and maintaining the brushes in diametrically disposed relation to said armature, a contact spring having connection with a source of electric current and with one of said arms, and a yoke rigid with said shaft and coupled with said plate to maintain said brush structure stationary with respect to said field member and to rotate the same with respect to said armature, said coupling being disengageable to permit rotation of said brushes through 180° with respect to said field member whereby reversal of direction of rotation of the machine is obtained.

7. A dynamo electric machine comprising, in combination, a toroidal armature having an endless insulated winding wound on the surface thereof and having on at least one end thereof a substantially flat annular end face disposed in a plane substantially perpendicular to the axis of the armature, the turns of the winding being arranged in a single layer with adjacent turns closely spaced to one another, a relatively rotatable field member cooperating therewith, and a brush assembly for establishing an electrical circuit to said winding and rotatable relative thereto, said winding being bared of insulation on said one flat end surface of the armature to provide a flat, smoothly continuous and unobstructed commutating surface, the brushes of said assembly being provided with flat contact engaging surfaces directly contacting said commutating surface.

8. In a dynamo electric machine having a field member and a brush assembly, an armature comprising a toroidal core consisting of a series of flat ring laminations of magnetizable material having low magnetic retentivity placed together in stacked relation and a uniform insulated conductor wound tightly about the surface of said core with the ends thereof secured together to form an endless winding, the turns of the winding being arranged in a single layer with adjacent turns closely spaced to one another, said winding at one end of the armature having a substantially flat annular surface disposed in a plane perpendicular to the axis of the armature, said surface being bared of insulation to provide a smoothly continuous and unobstructed commutating surface directly engaged by the brushes of said brush assembly for establishing a circuit to said winding.

9. In a dynamo electric machine the combination comprising a field member, a toroidal armature member including a flat annular commutating surface disposed in a plane perpendicular to the axis of the armature, means for mounting said members for relative rotation, a brush structure having a pair of diametrically arranged brushes, each of said brushes having a plane flat face for directly engaging the flat commutating surface of the armature and having opposite said face a hemispherically formed portion, said brush structure further including hemispherically formed sockets for the reception of the correspondingly shaped portions of said brushes to permit free pivoting movement of the brushes with respect to the armature so that the brushes can adjust themselves to maintain flat all over contact with the commutating surface, and means for fixing the brush structure at an angle with respect to the field member for the setting up of a rotating field having a predetermined direction of rotation.

10. A dynamo electric machine comprising in combination a rotor member and a stator member mounted for relative rotation, one of said members including a toroidal form core and an endless insulated winding thereon, said one member being provided at one end thereof with a plane, flat annular commutator defined by annularly aligned sections of said winding from which the insulation has been removed, the other of said members being provided with a pair of field poles, a pair of brushes, each of said brushes being provided with a plane, flat commutator engaging face, and a mounting for the brushes for positioning them with the flat faces thereof in relative sliding contact with said commutator, said mounting including means for permitting limited rocking movement of each of said brushes to insure that the brushes assume positions of flat, all-over contact on said commutator.

11. A dynamo electric machine described in claim 10 wherein said plane, flat annular commutator is disposed in a plane substantially perpendicular to the axis of rotation of said machine.

12. A dynamo electric machine described in claim 10 wherein said brush mounting means includes a universal joint for movably supporting each brush whereby to maintain the plane, flat face thereof in substantially co-planar relationship with the surface of the commutator.

13. A dynamo electric machine described in claim 10 wherein said brush mounting means includes a ball and socket joint for movably supporting each brush whereby to maintain the plane, flat face thereof in substantially co-planar relationship with the surface of the commutator.

14. A dynamo electric machine described in claim 10 wherein the plane, flat face of each brush is substantially circular in outline and of an area to simultaneously contact several successive sections of said winding.

15. A dynamo electric machine described in claim 10 wherein said toroidal core is provided with an annular recess into which said winding is pressed to tighten the winding about said core.

16. In a dynamo electric machine, an armature unit comprising a toroidal form core having an insulated endless winding thereon, one end of said armature being provided with a plane, flat annular commutator defined by annularly aligned sections of said winding from which the insulation has been removed, said commutator being disposed in a plane substantially parallel to the axis of said armature.

17. The armature unit described in claim 16 wherein said core member is provided with an annular recess into which said winding is pressed to tighten the winding about said core.

18. The armature unit described in claim 16 wherein a casing member is provided for the armature, said casing being made of good heat conducting material, and being substantially cup-shaped, said armature fitting snugly within the casing and in heat transfer relation thereto whereby heat developed in the armature may be dissipated rapidly through said casing.

19. A dynamo electric machine comprising, in combination, a toroidal armature having an endless insulated winding thereon and having on at least one end thereof a substantially flat annular end face bared of insulation and disposed in a plane substantially perpendicular to the axis of the armature, a relatively rotatable field member centrally arranged in said armature and having diametrical poles thereon, and a brush assembly coaxially with said field member, said brush assembly being provided with a cross member fixed at an angle with respect to the poles of said field member and having a pair of diametrically arranged brushes thereon, each of said brushes having a flat contact surface flatly engaging the end face of said armature and each being mounted on said cross member for limited rocking movement to insure self-alinement of the brushes in a position of flat, over-all contact.

20. A dynamo electric machine comprising, in combination, a toroidal armature having an endless insulated winding wound on the surface thereof in a single layer with adjacent turns closely spaced to one another, and having on at least one end thereof a substantially flat annular end face bared of insulation and disposed in a plane substantially perpendicular to the axis of the armature to form a flat and uninterrupted commutating surface, a stationary field member centrally arranged in said armature and presenting diametrical poles to the inner surface of said armature, means for mounting said armature for rotation about said field member, and a stationary brush assembly coaxial with said field member and provided with diametrically arranged brushes, each having a flat contact surface flatly engaging the end face of said armature and covering a substantial portion of the width thereof for establishing an electrical circuit to diametrical points on said armature which are arranged at an angle relative to the poles on the field member.

21. A dynamo electric machine comprising, in combination, a mounting plate, a toroidal armature having an endless insulated winding thereon and mounted for free rotation adjacent said mounting plate, said armature having on the inner end thereof facing said mounting plate a substantially flat annular end face bare of insulation and disposed in a plane substantially perpendicular to the axis of rotation of the armature, a field member mounted on said mounting plate and having diametrical poles thereon spaced closely adjacent the curved inner surface of said armature, a pair of stationary brushes on said mounting plate each having a flat contact surface for engaging diametrical points on said armature, and means for resiliently mounting said brushes on said mounting plate while permitting a limited amount of rocking movement to maintain the contact surfaces of said brushes in flat all over contact with the flat end face of said armature.

22. A dynamo electric machine comprising, in combination, a mounting plate, a rotor member including a cup facing said mounting plate and having a central shaft and a bearing for rotatively mounting the same on said mounting plate, a toroidal armature having an endless insulated winding thereon and snugly telescoped within the cup, said armature having on the inner end thereof facing said mounting plate a substantially flat annular end face bare of insulation and disposed in a plane substantially perpendicular to the axis of rotation of the armature, a field member mounted on said mounting plate and having opposite poles thereon spaced closely adjacent the curved inner surface of said armature, a pair of stationary brushes on said mounting plate each having a flat contact surface for engaging diametrical points on the armature, and a resilient mounting for said brushes permitting a limited amount of rocking movement thereof to enable the brushes to accommodate themselves to the armature in said rotor member for the maintenance of flat all over contact with the flat end face of said armature.

23. In a dynamo electric machine the combination comprising a field member, a toroidal armature member including a flat annular commutating surface disposed in a plane perpendicular to the axis of the armature, means for mounting said members for relative rotation, a brush structure having a pair of diametrically arranged brushes, each of said brushes having a plane flat face for directly engaging the flat commutating surface of the armature, said brush structure further including means for mounting the brushes for ball-and-socket movement with respect to the armature so that the brushes maintain flat all over contact with the commutating surface, the brush structure being fixed at an angle with respect to the field member for the setting up of a rotating field having a predetermined direction of rotation.

EDWARD L. BARRETT.

REFERENCES CITED

The following references are of record in the file of this patent:

UNITED STATES PATENTS

| Number | Name | Date |
| --- | --- | --- |
| 218,520 | Gramme | Aug. 12, 1879 |
| 354,538 | Curtis et al. | Dec. 21, 1886 |
| 406,015 | Wilson | June 25, 1889 |
| 423,912 | Diehl | Mar. 25, 1890 |
| 470,194 | Hosford | Mar. 8, 1892 |
| 480,728 | Kolben | Aug. 16, 1892 |
| 509,662 | Hoffman | Nov. 28, 1893 |
| 673,517 | Eck | May 7, 1901 |
| 1,005,842 | Hutches | Oct. 17, 1911 |
| 1,219,564 | Kouyoumjian | Mar. 20, 1917 |
| 1,811,180 | Landers | June 23, 1931 |
| 1,862,248 | Wesnigk | June 7, 1932 |
| 2,194,211 | Sansom | Mar. 19, 1940 |

OTHER REFERENCES

"Midget Motor," pp. 66, 67 of "Power Generation," March, 1948.